US012230911B2

(12) United States Patent
Diessel et al.

(10) Patent No.: US 12,230,911 B2
(45) Date of Patent: Feb. 18, 2025

(54) HOLDING FRAME, CONNECTOR AND ELECTRONIC DEVICE

(71) Applicant: Phoenix Contact GmbH & Co. KG, Blomberg (DE)

(72) Inventors: Thorsten Diessel, Hiddenhausen (DE); Manuel Tuenker, Doerentrup (DE); Lukas Brillo, Hoexter (DE); Hartmut Schwettmann, Rahden (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 250 days.

(21) Appl. No.: 17/778,424

(22) PCT Filed: Nov. 16, 2020

(86) PCT No.: PCT/EP2020/082265

§ 371 (c)(1),
(2) Date: May 20, 2022

(87) PCT Pub. No.: WO2021/104916

PCT Pub. Date: Jun. 3, 2021

(65) Prior Publication Data

US 2022/0399676 A1 Dec. 15, 2022

(30) Foreign Application Priority Data

Nov. 25, 2019 (DE) ..................... 10 2019 131 804.1
Nov. 25, 2019 (DE) ..................... 10 2019 131 806.8
Dec. 19, 2019 (EP) ..................................... 19218063

(51) Int. Cl.
*H01R 13/518* (2006.01)
*H01R 13/506* (2006.01)
*H01R 13/648* (2006.01)

(52) U.S. Cl.
CPC ......... *H01R 13/518* (2013.01); *H01R 13/506* (2013.01); *H01R 13/648* (2013.01)

(58) Field of Classification Search
None
See application file for complete search history.

(56) References Cited

U.S. PATENT DOCUMENTS 3,087,816 A 4/1963 Land
4,032,209 A 6/1977 Rutkowski
(Continued)

FOREIGN PATENT DOCUMENTS

CN 105814748 A 7/2016
CN 105977693 A 9/2016
(Continued)

OTHER PUBLICATIONS

Roloff Matek, "Elastische Feder, Maschinenelemente (Elastic Springs, Machine Elements)," ISBN: 3-528-54028-1, Dec. 31, 1987, p. 277, Vieweg, Germany.

*Primary Examiner* — Tho D Ta
(74) *Attorney, Agent, or Firm* — LEYDIG, VOIT & MAYER, LTD.

(57) ABSTRACT

A holding frame for a plug connector for installation into a metal connector housing and for the protective earthing thereof, and for accommodating similar and/or different modules, includes: a base frame; and at least one flange part. The holding frame is formed from at least two different materials, of which at least one material is electrically conductive. The base frame is a die-cast component. The at least one flange part is formed from resilient sheet metal. The at least one flange part has trapezoidal tapering.

17 Claims, 7 Drawing Sheets

(56) References Cited

U.S. PATENT DOCUMENTS

| | | | | |
|---|---|---|---|---|
| 6,371,788 | B1 * | 4/2002 | Bowling | H01R 13/639 439/701 |
| 6,679,168 | B1 | 1/2004 | Shih | |
| 2016/0285194 | A1 | 9/2016 | Herbrechtsmeier | |
| 2019/0334278 | A1 | 10/2019 | Wolff et al. | |
| 2020/0059034 | A1 | 2/2020 | Tiemann et al. | |
| 2022/0029346 | A1 | 1/2022 | Tiemann et al. | |

FOREIGN PATENT DOCUMENTS

| | | | | |
|---|---|---|---|---|
| CN | 109643866 | A | 4/2019 | |
| DE | 1020865 | B | 12/1957 | |
| DE | 1030865 | B | 5/1958 | |
| DE | 1590129 | A1 | 4/1970 | |
| DE | 10308652 | A1 | 9/2004 | |
| DE | 10308659 | B3 | 10/2004 | |
| DE | 102007061745 | A1 | 6/2009 | |
| DE | 202012103360 | U1 | 1/2013 | |
| DE | 102015103563 | A1 | 9/2016 | |
| DE | 102013113975 | B4 | 9/2018 | |
| DE | 102017108430 | A1 | 10/2018 | |
| DE | 102017108431 | A1 | 10/2018 | |
| DE | 102017108433 | A1 | 10/2018 | |
| EP | 3540867 | A1 | 9/2019 | |
| WO | WO-2015085995 | A1 * | 6/2015 | H01R 13/5025 |
| WO | WO 2018192617 | A1 | 10/2018 | |

* cited by examiner

HOLDING FRAME, CONNECTOR AND ELECTRONIC DEVICE

CROSS-REFERENCE TO PRIOR APPLICATIONS

This application is a U.S. National Phase application under 35 U.S.C. § 371 of International Application No. PCT/EP2020/082265, filed on Nov. 16, 2020, and claims benefit to German Patent Application No. DE 10 2019 131 804.1, filed on Nov. 25, 2019; German Patent Application No. DE 10 2019 131 806.8, filed on Nov. 25, 2019; and European Patent Application No. EP 19218063.6, filed on Dec. 19, 2019. The International Application was published in German on Jun. 3, 2021 as WO 2021/104916 A1 under PCT Article 21(2).

FIELD

The invention relates to a holding frame for a plug connector for installation in a metal connector housing and for the protective earthing thereof, as well as for accommodating similar and/or different modules, wherein the holding frame is formed from at least two different materials, of which at least one material is electrically conductive, the holding frame having a base frame and at least one flange part, the base frame being designed as a die-cast component, and the at least one flange part consisting of resilient sheet metal. The invention further relates to a plug connector having such a holding frame and to an electronic device.

BACKGROUND

Holding frames of this type serve for the modular use of modules, also called contact inserts, for example on plug connectors. One or more modules or contact inserts can be arranged on such a holding frame in order to be inserted together with the holding frame into a housing of a plug connector part or of a plug connector and to be connected to the housing via the holding frame. In this way, contact inserts can be combined with each other in a modular manner and arranged in or on a plug connector part via the holding frame.

Such modules can have one or more electrical contacts, for example. In this case, the modules are connected to electrical lines which are routed to a plug connector on the one hand, and on the other, form plugging contacts via which the plug connector can be brought into engagement with a mating plug connector part in a plug-in manner for electrical contact.

Such modular modules offer the advantage of flexible combinability and thus a variable usability of plug connectors.

When modules are inserted into a holding frame, it is necessary for the modules to be held on the holding frame in order to enable attachment of the holding frame to a plug connector for example, together with the modules. In a holding frame known from DE 10 2012 110 907 A1, it is provided for this purpose that a second holding frame part can be attached to a first holding frame part, which has recesses for receiving projection elements of modules, in order in this way to latch projection elements inserted into the recesses and thus lock them on the holding frame.

In a holding frame known from DE 20 2012 103 360 U1, two different recesses are provided on frame walls. Projection elements of modules can be inserted into first recesses on an upper edge of the frame walls so as to engage, whereas pin-like formations of the modules can be brought into latching engagement with second recesses in the form of openings.

DE 10 2013 113 975 B4 describes, as is shown in FIG. 13, a holding frame 100 for a plug connector with at least one flange part 16, which has a rectangular basic shape. Here, the flange part 16 has two opposite long edges, namely a first and a second edge, and at right angles thereto two short edges lying opposite one another, namely a third and a fourth edge. Two flange parts 16 are arranged opposite the base frame 10, wherein the modules 200 are held in the base frame 10 via the flange parts 16. The flange parts 16 are formed flat over their entire extension so that the flange parts 16 in each case extend only in one plane.

SUMMARY

In an embodiment, the present invention provides a holding frame for a plug connector for installation into a metal connector housing and for the protective earthing thereof, and for accommodating similar and/or different modules, comprising: a base frame; and at least one flange part, wherein the holding frame comprises at least two different materials, of which at least one material is electrically conductive, wherein the base frame comprises a die-cast component, wherein the at least one flange part comprises resilient sheet metal, and wherein the at least one flange part has trapezoidal tapering.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
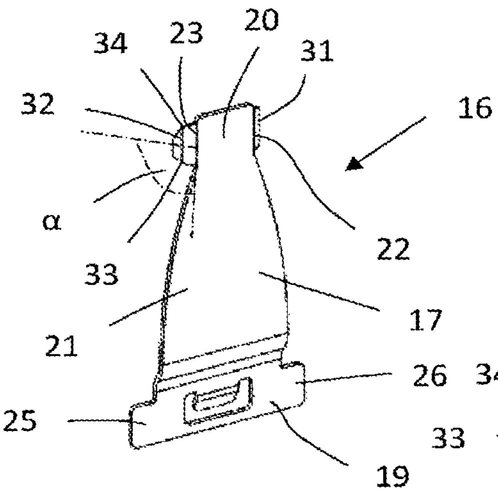
FIG. 1*a* is a schematic representation of a flange part according to the invention.

In an embodiment, the present invention provides a holding frame, a plug connector and an electronic device, in which the fastening of a module in a holding frame is improved.

In an embodiment, the holding frame of the present invention has at least one flange part with trapezoidal tapering.

Due to the trapezoidal tapering, the flange part, also called a wall segment, is now no longer rectangular. As a result of the tapering, two opposite outer edges of the flange part are not arranged parallel to one another, but instead these two outer edges are positioned at an angle to one another. These two outer edges run toward one another in the direction of the tapering. Due to the tapering, the flange part has a width changing over the length of the flange part, so that the flange part has no longer a constant width, as is the case with a rectangular flange part. Due to this tapering, a uniformly distributed bending stress can be achieved over the length of the flange part and thus a uniform deformation of the flange part over the bending length of the flange part during the insertion and removal of the modules into/out of an interior of the base frame. In addition, a greater elastic deflection can take place without plastic deformation than when a rectangular flange part, which has a constant width, is used. As a result of the tapering, a uniform stress curve can be achieved over the length of the flange part when the flange part flexes during the insertion and removal of the respective module. The trapezoidal tapering causes a reduction in the spring stiffness of the flange part formed from a resilient sheet metal. With the same deflection, a pressing force can thereby be reduced, as a result of which a plugging force required for inserting the modules into the holding frame can in turn be reduced. Due to the tapering, material can also be saved in the flange part, wherein material is saved in areas which are preferably not necessary for the functioning of the flange part, namely holding the modules on the base frame.

The at least one flange part preferably has a fastening region for holding the modules, wherein the at least one flange part preferably tapers trapezoidally in the direction of the fastening region. The flange part thus preferably has its smallest width directly adjacent to the fastening region. This means that the flange part can perform a greater deflection during insertion of the modules directly adjacent to the fastening region or in the fastening region, whereby an improved rear latching and thus latching of the fastening region to the module can be achieved at the same time. In the direction of the fastening region the elasticity of the flange part can be increased by the tapering, whereby a kind of flexible joint can be formed on the flange part. The flange part is designed to be resilient and can for this purpose be formed for example from a spring plate. When a module is inserted, the wall segments mounted on the base frame can thereby spring away at their fastening region outwards from the interior of the base frame, in order to enable insertion of the module into the interior. When the module is positioned in the desired position in the interior of the base frame, the fastening region of the flange part can again flex or pivot back in the direction of the interior of the base frame, so that the fastening region of the flange part can hold the module in this position.

The fastening region is preferably formed on a head region of the at least one flange part which is positioned on an end section of the flange part opposite a foot region. The fastening region and the foot region of a flange part thus preferably have a greatest possible distance from each other.

The at least one flange part can have a central section between the foot region and the head region, wherein the central section can taper trapezoidally from the foot region towards the head region and can be reversibly deformable. Due to this trapezoidal tapering, a uniform deformation of the flange part, in particular in the area of the central section of the flange part, can be achieved over the bending length of the flange part during the insertion and removal of a module into/from the interior of the base frame. The deformation is reversible, which means that an elastic and not any plastic deformation of the central section can take place. Due to the trapezoidal tapering, the central section forms a deformation section of the flange part. The flange part thus has the trapezoidal tapering in the area of its deformation section. Deformation of the flange part preferably occurs exclusively in the central section and not at the head region or fastening region and also not at the foot region of the flange part. Due to the tapering from the foot region towards the fastening region or head region, the bending stress of the flange part can decrease from the foot region towards the fastening region. The foot region can form a clamping location of the flange part on the base frame, especially on a receiving section of the base frame. As a result of the reduction in the width of the flange part due to the trapezoidal tapering, starting from this clamping location—the foot region of the flange part—a uniform stress profile over the length of the flange part can be achieved when the flange part flexes during the insertion and removal of the respective module. In the direction of the head region, the elasticity of the flange part can be increased by the tapering, whereby a kind of flexible joint can be formed on the flange part. Seen along the length of the flange part, the central section preferably has a much larger surface area than the foot region and the fastening region of the flange part. In contrast to the central section, the foot region and/or the head region can have a constant width so that it can be provided that the trapezoidal tapering is formed exclusively in the central section. The trapezoidal tapering is preferably formed over the entire length of the central section.

The two opposite outer edges of the flange part, which are not arranged parallel to each other but are designed to tapering toward each other in order to form the trapezoidal tapering, can be formed straight. However, it is also possible for these outer edges of the flange part which extend along the central section to have a curved shape. Due to the curved shape of the outer edges, the distribution of the bending stress within the flange part can be further improved, so that the load acting on the flange part during insertion and removal of the modules can be reduced and at the same time an optimized spring effect of the flange part can be achieved.

In order to hold the modules, the fastening region can have at least one fastening tab. The fastening tab can be designed in such a way that, in the mounted position, the fastening tab can rest on an upper side of a projection element of the respective module, so that, in the insertion direction of the module into the base frame, the fastening tab can prevent a movement of the inserted module that is counter to the insertion direction of the module. The at least one fastening tab is preferably designed such that it projects from a main extension plane of the flange part.

In order to be able to achieve a higher stability when the modules are held in their inserted position in the base frame, the fastening region of the flange part can have two fastening tabs, so that two fastening tabs can rest simultaneously on an upper side of a projection element of the respective module. The two fastening tabs of a fastening region of a flange part can be formed symmetrically to each other. However, the two fastening tabs can also be asymmetrical to each other.

The two fastening tabs of a fastening region of a flange part can be arranged on opposite outer edges of the flange part. The two outer edges preferably delimit the respective flange part towards the outside. Due to their arrangement on the outer edges, the fastening tabs can be arranged in the form of two wings on the flange part.

The fastening tabs preferably have a bent design in the region of the connection to the respective outer edge. The fastening tabs are preferably bent outwards from the main extension plane of the flange part. The fastening tabs can preferably each be formed bent at an angle $\alpha \geq 90°$ to the outer edge of the flange part. Particularly preferably, the fastening tabs can each be formed bent at an angle $\alpha \geq 180°$ to the outer edge of the flange part.

The at least one fastening tab preferably has a length which is at least three times a thickness of the flange part. The thickness of the flange part means the sheet metal thickness of the flange part if this is formed from a spring plate. It has been shown that with a length of the respective fastening tab of at least three times the thickness of the flange part, particularly good holding properties can be achieved with the fastening tabs for holding the modules in the base frame. The length of the fastening tab is located in the main extension direction of the fastening tabs.

In a mounted position, the at least one flange part can be arranged on a receiving section formed on a side wall of the base frame, wherein the receiving section can have an opening for receiving a projection element of a module inserted into an interior of the base frame, wherein in the mounted position of the flange part, the opening can be at least partially overlapped by the fastening region of the flange part. The flange part and preferably several such flange parts can be arranged on the base frame. For example, each module inserted or introduced into the base frame can be held onto or fastened to the base frame via two oppositely arranged flange parts. The mounted position is the position in which the flange part is arranged on the base frame and a module that has been introduced into the interior of the base frame can be held by the flange part. A plurality of receiving sections are preferably formed on two opposite side walls of the base frame on which the flange part can be arranged. The receiving sections of a side wall are preferably arranged next to each other and thus in a row. The receiving sections are preferably formed at least in areas in the respective side wall of the base frame, so that the receiving sections can form a defined receiving region for the flange parts. A receiving section is assigned to each flange part to be arranged on the base frame, so that in each case one flange part can be arranged in each receiving section. Each receiving section preferably has an opening which, in the mounted position of the flange parts on the base frame, is in each case overlapped at least in regions by the fastening region of the flange part assigned to the receiving section. The openings are preferably designed in the form of openings on the base frame or on the side walls of the base frame. The openings preferably extend into the base frame starting from the upper edge of the base frame. Via the openings, the flange parts can be brought into operative connection with the modules, especially with the projection elements of the modules, in order to be able to hold the modules in the interior of the base frame. For this purpose, the projection elements of the modules can project into the respective opening. In the mounted position, the openings can be covered, at least in some regions, by the fastening region of the respective flange part, so that the flange parts can each cover or overlap a projection element of an inserted modules at the end face.

In order to be able to form a coding for the insertion of the modules in the correct position, the openings of the receiving sections formed on the first side wall can have a greater width than the openings of the receiving sections, which openings are formed on the second side wall. The two projection elements formed on a module likewise preferably have different widths, so that an insertion of the module can only be done in such a way that the wider projection element can be inserted into the wider opening of a receiving section and the narrower projection element of a contact insert can be inserted into the narrower opening of a receiving section. It is thereby possible to prevent incorrect plugging of the modules into the base frame and thus into the holding frame.

The receiving sections are preferably formed in each case on an outer side of the base frame that faces away from the interior. In the mounted position, the flange parts are thus preferably on the outer side of the base frame. Preferably, in the mounted position no part or area of a flange part is arranged on an inner side of the base frame which inner side faces in the direction of the interior of the base frame. The flange parts therefore no longer have to have a design which is elaborately bent, because, in the case of the flange parts according to the invention, it is no longer necessary for the lower edge of the base frame to be gripped in an encompassing manner.

The at least one flange part is preferably fastened or held via its foot region to/on the receiving section assigned to it and thus to the base frame. The flange part is thus preferably not fastened to the base frame via its head region or its fastening region. In contrast to the foot region, the head region or the fastening region is preferably exposed relative to the base frame, so that in the mounted position preferably no contact with the base frame is formed between the head region or the fastening region of the flange part.

The fastening of the foot region of a flange part to the receiving section or to the base frame can be effected in various ways. For example, the fastening can be formed by means of a latching connection and/or a riveted connection and/or an adhesive connection between the flange part and the base frame.

At its foot region, the at least one flange part can have a fastening element which in the mounted position can be in engagement with an opening formed on the base frame. Each receiving section can have such an opening. The fastening elements can be designed, for example, in the form of a tab or a lug which, in the mounted position, enters into an opening on the base frame or on the respective receiving section and there can latch or hook.

A fastening of a flange part to the base frame can preferably be designed such that in the mounted position the base frame has at least one slot-shaped cut-out into which the foot region of the at least one flange part can be inserted. Each flange part can thereby be arranged and fastened individually on the base frame and thus individually on its respective associated receiving section. In the case of such a fastening, however, the flange parts can also be arranged and fastened in pairs on the base frame and thus two or more flange parts on its respective associated receiving section. By inserting the flange parts at least with their foot region into a slot-like cut-out of the receiving section assigned to them, the mounting of the flange parts on the base frame can be accomplished particularly easily and quickly. The structural design of the holding frame can also be considerably simplified as a result. The slot-like cut-outs can each form a pocket on the base frame into which the flange parts, in the mounted position, can engage at least in some regions, in this case with their foot region. The foot region of the flange parts with which the wall segments can be inserted into the slot-like cut-out is preferably formed on an end section of the flange parts.

The at least one slot-shaped cut-out is preferably formed on a lower edge of the base frame. The flange parts can thus preferably each be fastened to the base frame from below and inserted into the slot-like cut-outs. The mounting direction of the flange parts on the base frame is thus preferably counter to the insertion direction of the modules into the interior of the base frame, so that an insertion of the flange parts into the respective slot-like cut-out can take place in an opposite direction to the insertion of the modules into the base frame. The modules are preferably inserted from above into the interior of the base frame.

The slot-like cut-outs of the receiving sections formed on the first side wall can be connected to one another and/or the slot-like cut-outs of the receiving sections formed on the second side wall can be connected to one another. The slot-like cut-outs formed on a side wall are preferably arranged one after the other in a row. If the slot-like cut-outs formed on a side wall are connected to one another, the slot-like cut-outs can take the form of a cut-out, which can span all receiving sections of a side wall. Such a slot-like cut-out can extend over more than ⅔ of the length of the side wall.

In order to be able to achieve a separation of function between the foot region and the central section, an offset can be formed in a connection region of the foot region on the central section such that the foot region can extend in a first plane and the central section can extend in a second plane arranged offset to the first plane. In the mounted position within the base frame, the foot region can thereby be arranged in the slot-like cut-out, wherein on the connection region of the flange part having the offset, the flange part can be guided out of the cut-out in the mounted position, so that the central section and also the fastening region or the head region of the flange part can be guided along the outer side of the base frame and the said outer side thus barely no longer engages in the slot-like cut-out of the receiving section. Due to the offset along the length of the flange part, the flange part is no longer formed flat over its entire length.

The receiving sections can each have a bearing face against which an inner surface of the flange parts facing in the direction of the interior of the base frame can lie in the mounted position. Due to the abutment of the flange parts over their central section on the respective receiving section, a good and positionally secure support of the flange parts on the receiving sections and thus on the base frame can be achieved. The bearing face preferably faces away from the interior of the main frame.

A particularly positionally secure attachment of the flange parts on the base frame can further be achieved by the fact that the bearing face of a receiving section can be delimited by two opposite inner edges, wherein in the region of the central section of the flange parts the outer edges of the flange parts can, in the mounted position, adjoin the inner edges of the receiving section assigned thereto in a positive-locking manner. A lateral displacement of the flange parts, especially during the insertion and removal of the modules, can thereby be reliably prevented, because the flange parts are supported on both sides by the outer edges and are limited in their movement.

It is further possible for an identification element to be fastened to each of the flange parts. The identification element can already be labeled or can be labeled individually by the user. The identification elements can provide the possibility of labeling the modules or the plug-in locations for the modules in the interior of the base frame. Particularly preferably, the identification element can be attached or be attachable to the foot region of the flange part. The identification element can, for example, be inserted together with the foot region into the slot-like cut-out in order to secure the identification element. In addition, it can further be possible for the identification element to be glued to the flange part. By means of the identification element, an individual identification of the plug-in locations for the modules is possible without increasing the necessary installation space for the holding frame.

The flange parts can be designed as individual elements, or two or more flange parts arranged on a side wall can be connected to one another. The interconnected flange parts are then preferably formed integrally with one another.

Particularly preferably, the flange parts are integrally connected to one another at their foot region. If two or more flange parts are connected to one another, the fastening of the flange parts to the base frame can be accomplished even more quickly.

The object according to the invention is further achieved by means of a plug connector which has a housing, a holding frame arranged in the housing and at least one module accommodated in the holding frame, wherein the holding frame is designed and developed as described above.

Furthermore, the object according to the invention is achieved by means of an electronic device which has at least one above-described, designed and further developed plug connector.

FIGS. 2 to 7 each show a schematic representation of a holding frame 100 which can be arranged in a housing of a plug connector.

The holding frame 100 has an integrally formed base frame 10. The base frame 10 has a first side wall 11, a second side wall 12 opposite the first side wall 11, a first end wall 13 and a second end wall 14 opposite the first end wall 13. The two side walls 11, 12 are arranged parallel to one another. The two end walls 13, 14 are likewise arranged parallel to one another. The end walls 13, 14 are arranged at a 90° angle to the side walls 11, 12. The two side walls 11, 12 and the two end walls 13, 14 enclose or delimit an interior 15 of the base frame 10. Modules 200 can be inserted into this interior 15 in the insertion direction E and attached as shown, for example, in FIG. 6.

Figure 1B:
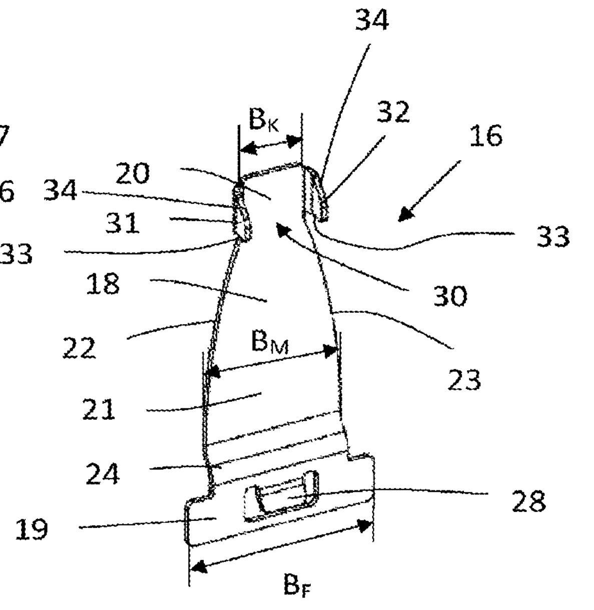
FIG. 1*b* is a further schematic representation of the flange part shown in FIG. 1.

The modules 200 are fastened via flange parts 16 arranged on the base frame 10, as are shown in particular in FIGS. 1*a* and 1*b*. The flange parts 16 arranged on a base frame 10 are in each case configured identically. In the base frame 10 shown here, four such flange parts 16 are arranged, wherein two flange parts 16 are arranged on the first side wall 11 and two flange parts 16 are arranged on the second side wall 12.

The base frame 10 is made of a different material to the flange parts 16. The base frame 10 is made of a material which has a lower elasticity and thus a greater stiffness than the flange parts 16.

The base frame 10 is designed to be rigid. The base frame 10 is designed as a die-cast component.

The flange parts 16 are each designed to be resilient. The flange parts 16 can be formed from a spring plate.

FIG. 1*a* shows a top view of an outer surface 17 of a flange part 16, which, in the position mounted on the base frame 10, faces away from the interior 15 of the base frame 10.

FIG. 1*b* shows a top view of an inner surface 18 of the flange part 16 which, in the position mounted on the base frame 10, faces in the direction of the interior 15 of the base frame 10.

The flange parts 16 each have a foot region 19, a head region 20 and a central section 21 arranged between the foot region 19 and the head region 20. Viewed along the length of the flange part 16 from the foot region 19 towards the head region 20, the central section 21 has a substantially larger surface area than the head region 20 and the foot region 19. The foot region 19 is formed on a first end section of the flange part 16 and the head region 20 is formed on a second end section of the flange part 16 opposite the first end section.

The flange part 16 has its greatest width $B_F$ at the foot region 19. The flange part 16 has its smallest width $B_K$ at the head region 20. In the region of the central section 21, the flange part 16 tapers in that the width $B_M$ of the central section 21 tapers from the foot region 19 towards the head region 20. Due to the tapering of the width $B_M$ of the central section 21 from the foot region 19 towards the head region 20, a uniform deformation of the flange part 16 over the length of the flange part 16 during insertion and removal of the modules 200 can be achieved.

In the region of the central section 21, the outer edges 22, 23 of the flange part 16 are not formed in a straight line, but they have a curved shape along the length of the central section 21 and thus from the foot region 19 up to the head region 20. However, the two outer edges 22, 23 of the flange part 16 can also be designed in a straight line. The outer edges 22, 23 do not run parallel to one another, but are arranged in relation to each other. Starting from the foot region 19, the outer edges 22, 23 run toward each other in the direction of the head region 20, so that in the region of its central section 21 the flange part 16 tapers trapezoidally from the foot region 19 towards the head region 20.

An offset is formed in the connection region 24 of the foot region 19 on the central section 21 in such a way that the foot region 19 extends in a first plane and the central section 21 extends in a second plane offset with respect to the first plane. The first plane and the second plane are essentially oriented parallel to each other.

Figure 5:
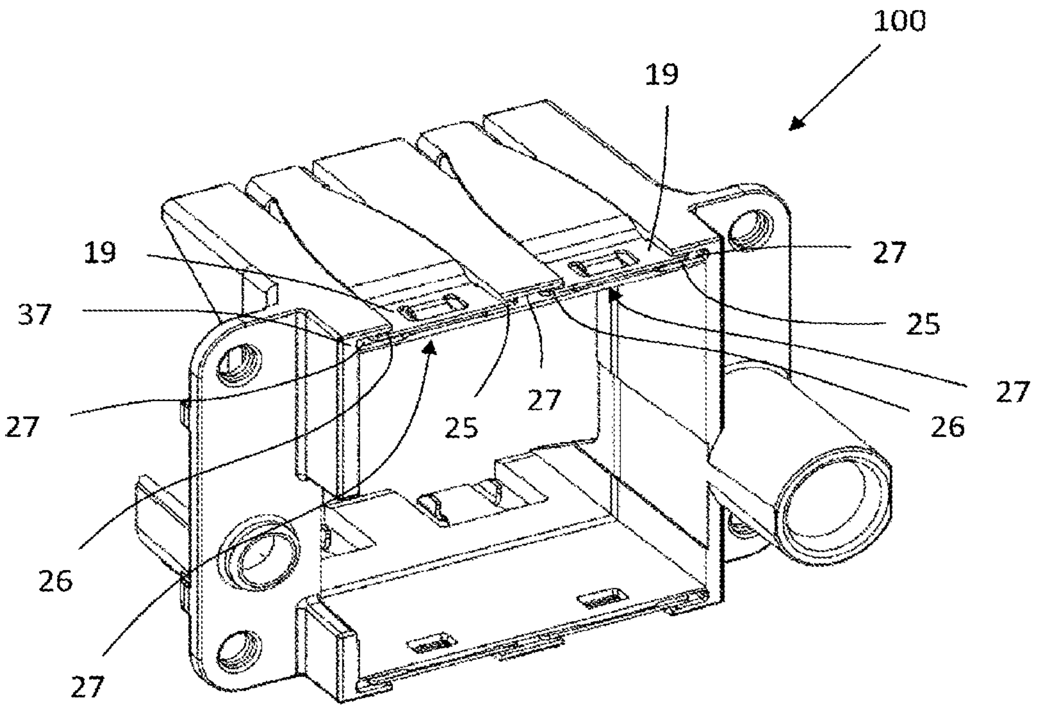
FIG. 5 is a schematic representation of the holding frame shown in FIG. 4 in a tilted view.

The foot region 19 has two laterally formed shoulder surfaces 25, 26 which, in the mounted position of the flange part 16 on the base frame, can both engage in a slot-like cut-out 27 of a receiving section 35 formed on the base frame 10, as can be seen, for example, in FIG. 5. The two shoulder surfaces 25, 26 project laterally outwards in such a way that they laterally overlap or project beyond the central section 21 and the head region 20.

The foot region 19 further has a fastening element 28 which can engage in an opening 29 formed on the base frame 10. The fastening element 28 is designed here in the form of a tab which projects from the foot region 19 and which is formed bent in the direction of the base frame 10. The fastening element 28 in the form of the tab can hook into the opening 29. The fastening element 28 is formed in the center of the width $B_F$ of the foot region 19.

A fastening region 30, via which a module 200 inserted into the interior 15 can be held in the interior 15, is formed at the head region 20. The fastening region 30 has two fastening tabs 31, 32. The fastening tabs 31, 32 extend in the mounted position of the flange part 16 on the base frame 10 in the direction of the interior 15 of the base frame 10. The two fastening tabs 31, 32 are each integrally formed on one of the two outer edges 22, 23 of the flange part 16. In the embodiments shown in FIGS. 1*a*, 1*b*, the fastening tabs 31, 32 are each formed bent at an angle $\alpha$ of about 90° to the outer edge 22, 23 of the flange part 16. The fastening tabs 31, 32 project from the main extension plane of the flange parts 16.

The lower edges 33 of the fastening tabs 31, 32, with which the fastening tabs 31, 32 rest on the projection elements 210 of the modules 200 in order to be able to hold the modules 200 in the interior 15 of the base frame 10, have an essentially straight design. The upper edges 34 of the fastening tabs 31, 32 opposite the lower edges 33 are, on the other hand, formed obliquely so that the upper edges 34 can form an insertion bevel in the direction of the insertion direction E of the modules 200 into the interior 15 of the base frame 10. As a result of the insertion bevel, the modules 200, especially the projection elements 210 of the modules 200, can slide during their insertion along the upper edge 34 of the two fastening tabs 31, 32 and thereby bend the flange parts 16 outwards, so that the flange parts 16 spring outwards and open up the interior 15 of the base frame 10, so that the modules 200 with their projection elements 210 can be inserted into the interior 15 of the base frame 10. When the modules 200 are inserted into the interior 15, the flange parts 16 can again spring back automatically until they rest with their lower edge 33 on the projection elements 210 in order to hold the modules 200 in the interior 15 of the base frame 10. The length of the individual fastening tabs 31, 32 is preferably at least three times the thickness or the sheet metal thickness of the flange part 16, as a result of which particularly good holding properties can be achieved in the fastening tabs 31, 32 for holding the modules 200 in the base frame 10.

Figure 2:
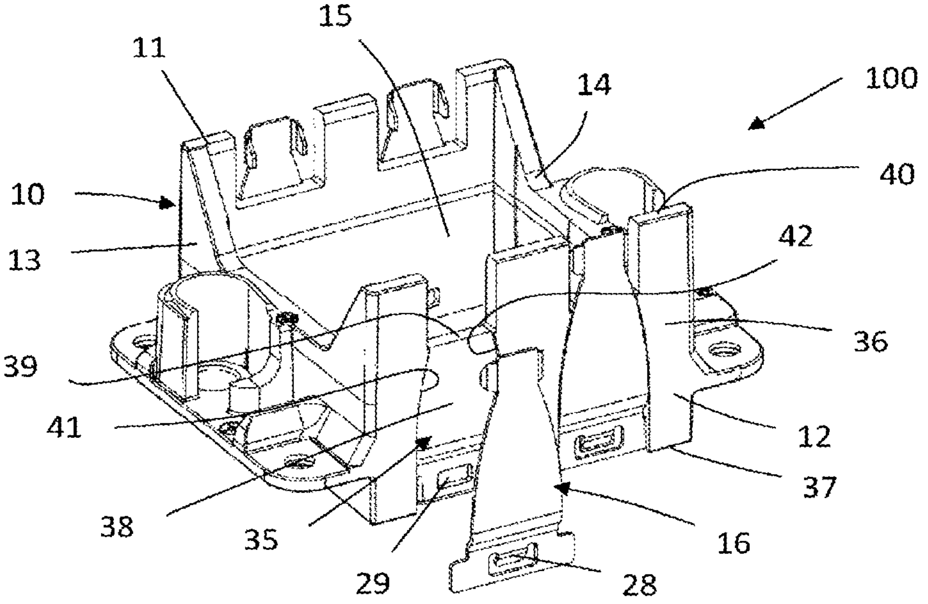
FIG. 2 is a schematic representation of a holding frame according to the invention during the mounting of a flange part on a base frame.

As can be seen in FIG. 2, the base frame 10 has a receiving section 35 for each flange part 16. The receiving sections 35 are formed on an outer side 36, facing away from the interior 15, of the base frame 10. The receiving sections 35 are formed on the two side walls 11 and 12 of the base frame 10. In the embodiment shown here, two receiving sections 35 are formed in each case, on both the first side wall 11 and the second side wall 12.

Each receiving section 35 has a slot-like cut-out 27 into which the foot region 19 of the respective flange part 16 can be inserted with its two shoulder surfaces 25, 26. In the embodiment shown here, the slot-like cut-outs 27 of the receiving sections 35 of the first side wall 11 and the slot-like cut-outs 27 of the receiving section 35 of the second side wall 12 are in each case connected to one another, as can be seen in FIG. 5, so that the cut-outs 27 of the receiving sections 35 of a side wall 11, 12 together form one cut-out 27 per side wall 11, 12. The respective cut-out 27 extends over almost the entire length of the respective side wall 11, 12.

The cut-outs 27 of the receiving sections 35 are formed on a lower edge 37 of the base frame 10. The flange parts 16 can therefore be fastened to the base frame 10 from below along a mounting direction M. The flange parts 16 can thus be fastened on the base frame 10 counter to the insertion direction E of the modules 200 into the interior 15 of the base frame 10.

The receiving sections 35 each have a bearing face 38 above their slot-like cut-out 27. The bearing faces 38 are each molded-in on the outer side 36 of the base frame 10, by the bearing faces 38 each forming a kind of cut-out on the outer side 36 of the base frame 10. In the mounted position, the central section 21 of the respective wall section 16 rests flat against the bearing face 38. The bearing faces 38 are each delimited by two opposite inner edges 41, 42, wherein, in the mounted position, the outer edges 22, 23 of the respective flange part 16 adjoin the inner edges 41, 42 in a positive-locking manner. The inner edges 41, 42 thus have a curved shape like the outer edges 22, 23. The inner edges 41, 42 are preferably designed to be high enough that, in the mounted state, the flange parts 16 terminate flush with the outer side 36 of the base frame 10. By means of the inner edges 41, 42, the bearing face 38 of the receiving sections 35 is arranged offset relative to the outer side 36 of the base frame 10 in each case in the direction of the interior 15 of the base frame 10.

Above the bearing face 38, the receiving sections 35 each have an opening 39 which, starting from an upper edge 40 of the base frame 10, extends into the respective side wall 11, 12 of the base frame 10. In the mounted position of the flange parts 16, the fastening region 30 or the head region 20 of the respective flange part 16 overlap the opening 39 at least in some regions. The fastening tabs 31, 32 can project into the opening 39. In the area of the opening 39, the fastening tabs 31, 32 can retain the modules 200 by the fastening tabs 31, 32 resting on the projection elements 210 of the modules 200, which project into the opening 39, as can be seen in particular in FIG. 6.

Figure 7:
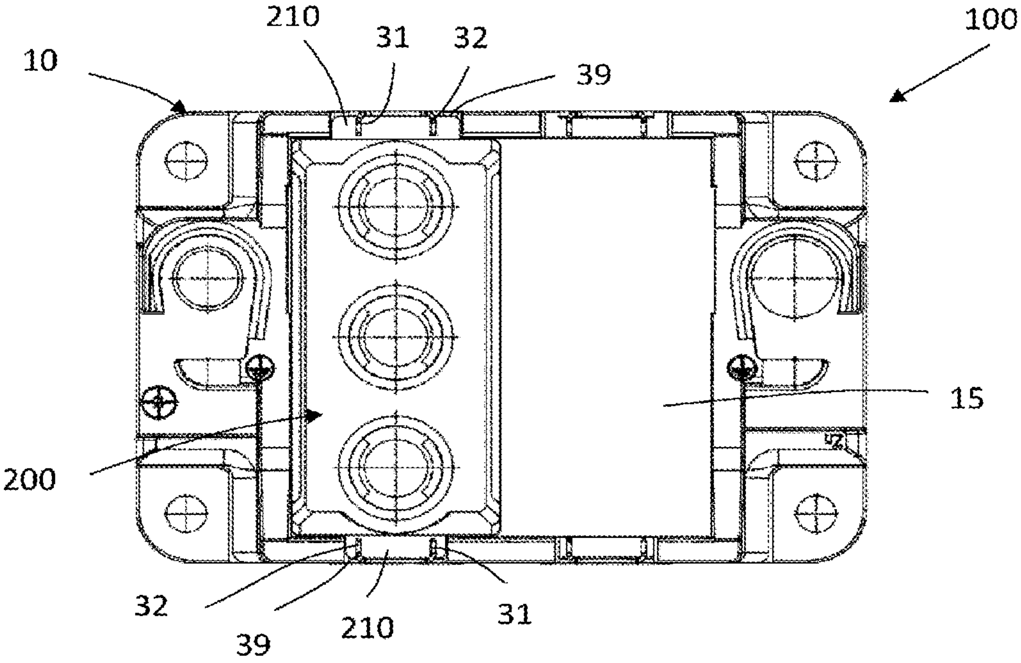
FIG. 7 is a schematic representation of the holding frame shown in FIG. 6 with the installed module as seen from above in a top view.

As can be seen in particular in FIG. 2 and FIG. 7, the openings 39 on the first side wall 11 have a greater width than the openings 39 on the second side wall 12.

Figure 3:
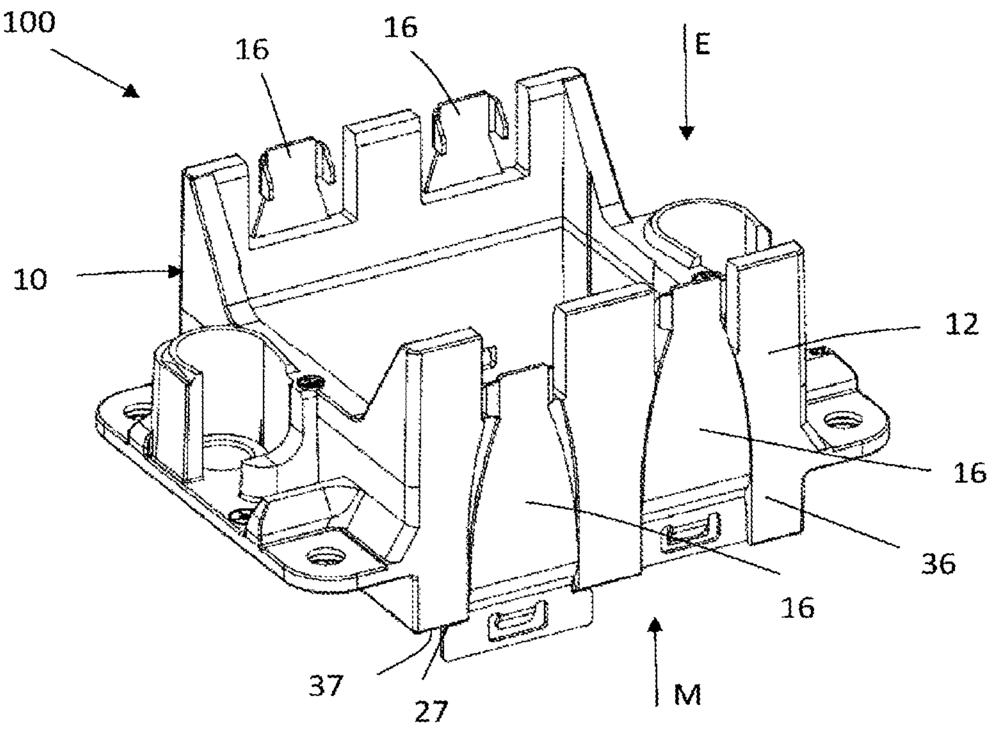
FIG. 3 is a further schematic representation of the holding frame shown in FIG. 2 during the mounting of a flange part.
Figure 4:
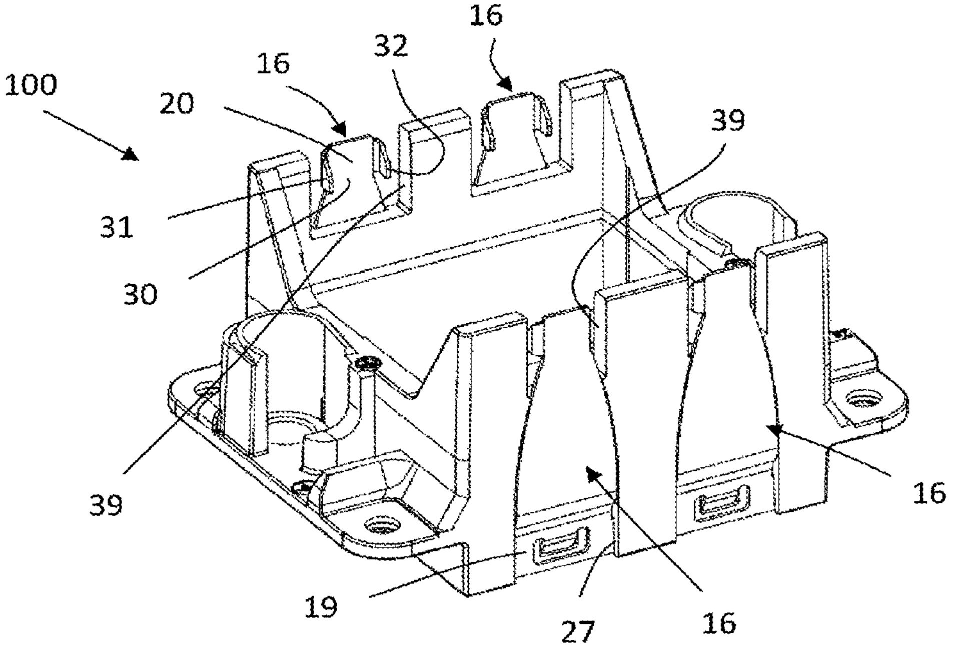
FIG. 4 is a schematic representation of the holding frame shown in FIGS. 2 and 3 with the flange parts in the mounted position.

FIG. 3 shows the mounting of one of the flange parts 16 on the base frame 10 by the flange part 16 being inserted into the slot-like cut-out 27 in the mounting direction M, wherein especially the two shoulder surfaces 25, 26 of the foot region 19 are inserted into the slot-like cut-out 27 and thus engage in the slot-like cut-out 27. With its central section 21, the flange part 16 slides along the bearing face 38. The flange parts 16 are inserted far enough in that the fastening element 28 of the foot region 19 is hooked into the opening 29 on the base frame 10, as can be seen in FIG. 4. In this mounted position, the head region 20 or the fastening region 30 of the flange part 16 is located in the region of the opening 39 in order to overlap it at least in some regions.

Figure 6:
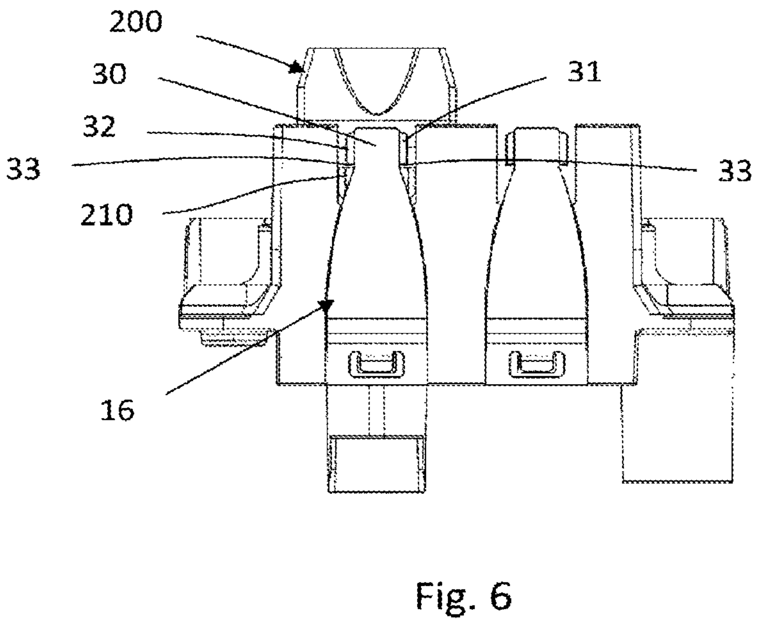
FIG. 6 is a schematic representation of the holding frame shown in FIG. 4 with an installed module.

When the flange parts 16 are mounted on the base frame 10, the modules 200 can be inserted into the interior 15 of the base frame 10 in the insertion direction E. In this case, the modules 200 slide along with their projection elements 210 on the upper edges 34 of the fastening tabs 31, 32, as a result of which these fastening tabs, and thus the fastening region 30 of the respective flange part 16, spring outwards in order to allow the projection elements 210 to pass by at the fastening tabs 31, 32. When the modules 200 are guided past the fastening tabs 31, 32, these can spring back in the direction of the interior 15 until they rest on the projection element 210 at the top, as can be seen in FIGS. 6 and 7. In this position, the projection elements 210 are each covered at the end face by the flange part 16 assigned to them, especially from the central section 21 of the flange part 16, as can be seen, for example, in FIGS. 6 and 7.

Figure 8:
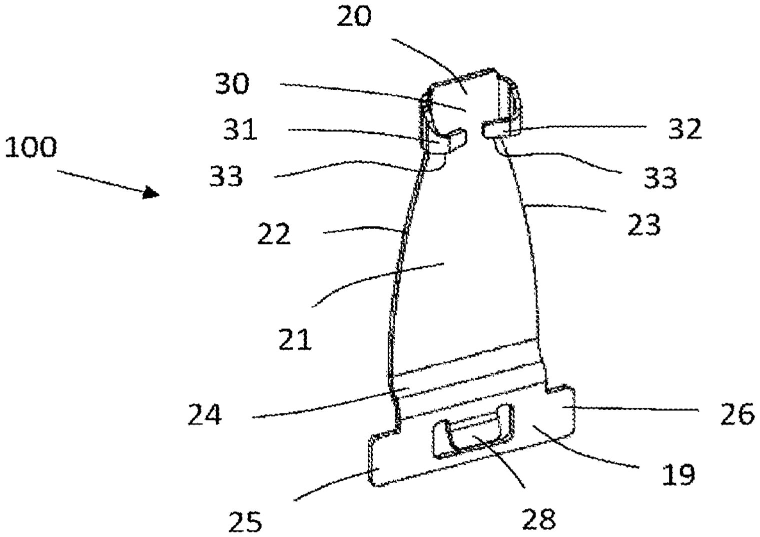
FIG. 8 is a schematic representation of a further flange part according to the invention.
Figure 9:
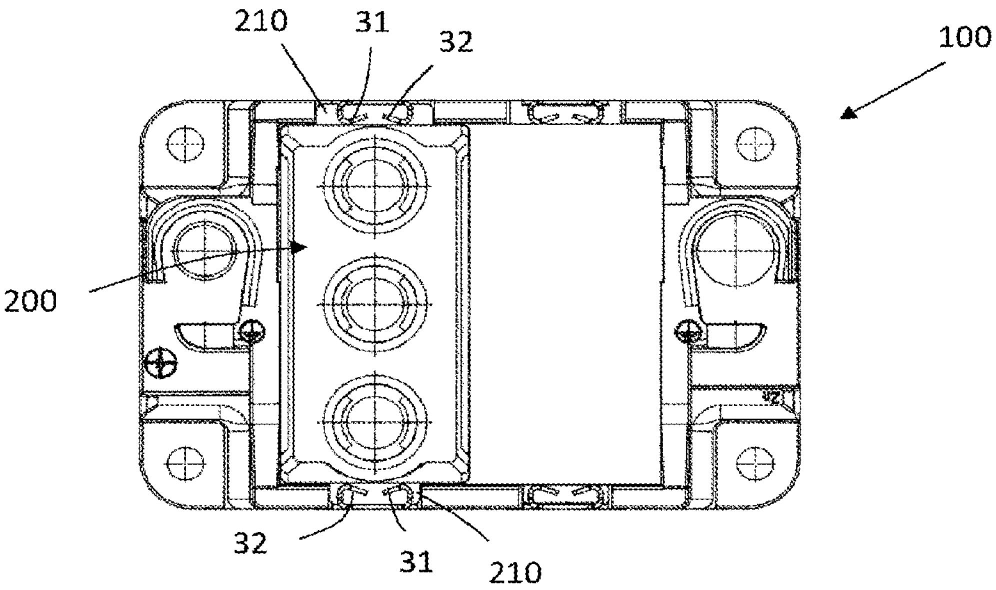
FIG. 9 is a schematic representation of a holding frame with flange parts as shown in FIG. 8 and an installed module.

FIGS. 8 and 9 show a similar embodiment to the embodiment shown in FIGS. 1*a*, 1*b* and 2 to 7, wherein here only the shape of the fastening tabs 31, 32 is designed differently, because here the fastening tabs 31, 32 are bent at an angle $\alpha \geq 180°$ to the outer edges 22, 23 of the flange part 16. In the embodiment shown in FIGS. 8 and 9, the fastening tabs 31, 32 of a flange part 16 are to be bent toward one another.

Figure 10:
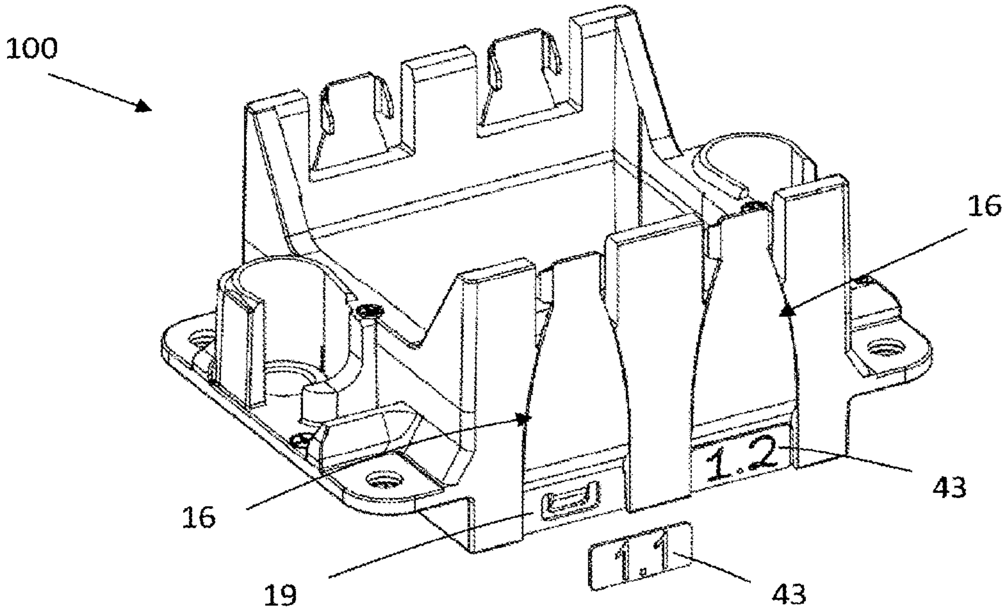
FIG. 10 is a schematic representation of a holding frame as shown in FIG. 4 with identification elements.

FIG. 10 further shows the arrangement of an identification element 43 in the area of the flange part 16. The identification element 43 is arranged at the foot region 19 on the flange part 16. Here, the identification element 43 is fastened to the foot region 19 of the flange part 16 by an adhesive connection.

Figure 11:
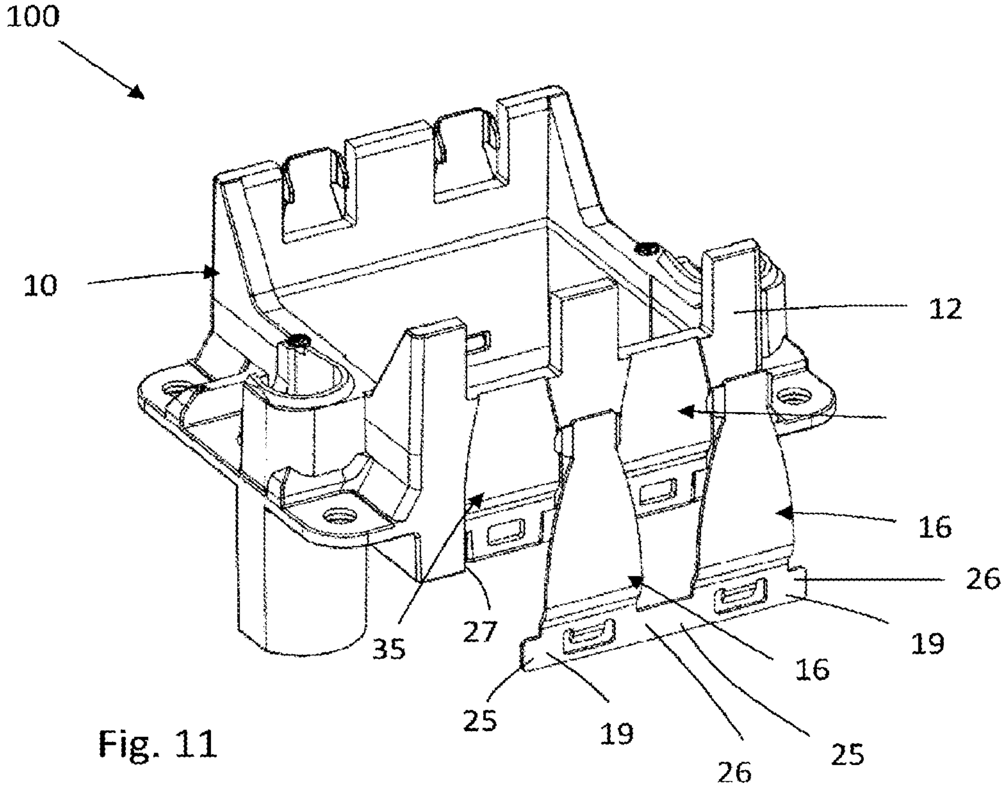
FIG. 11 is a schematic representation of a holding frame according to the invention during the mounting of two flange parts integrally connected to one another on a base frame.
Figure 12:
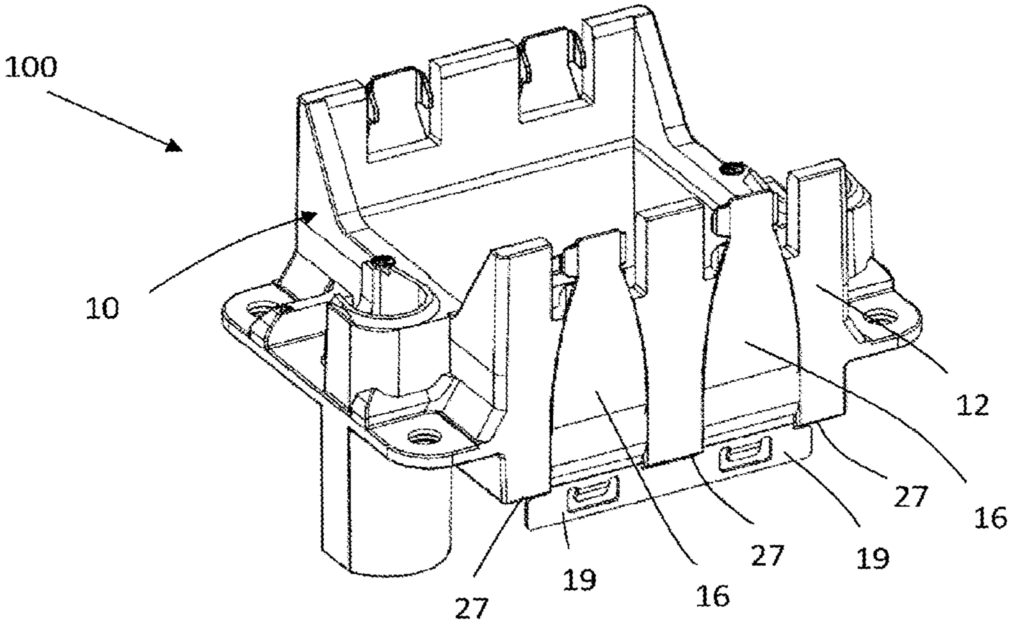
FIG. 12 is a further schematic representation of the two flange parts integrally connected to one another shown in FIG. 11 during the mounting on the base frame.
Figure 13:
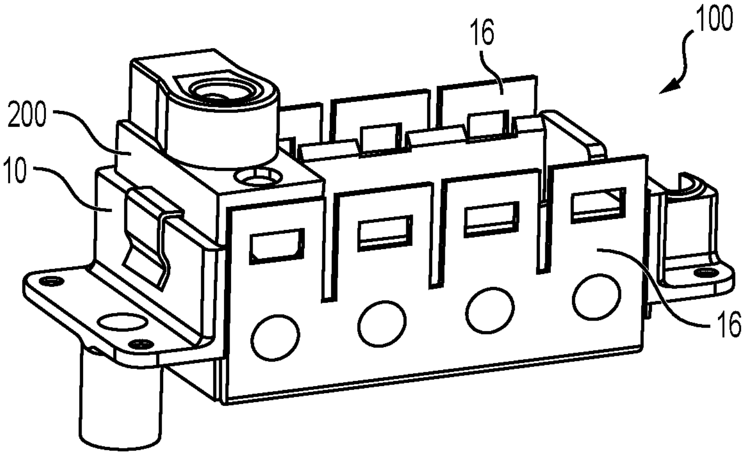
Prior art Fig. 13
FIG. 13 is a schematic representation of a holding frame according to the prior art.

FIGS. 11 and 12 show an embodiment in which the two flange parts 16 arranged on a side wall 12 are integrally connected to one another. The two flange parts 16 are formed integrally with one another at their foot region 19. The flange parts 16 are integrally connected to one another via the shoulder surfaces 25, 26 of the foot regions 19.

The cut-out 26 extends here over the two receiving sections 35 of the side wall 12 and thus over almost the entire length of the side wall 12. The integrally formed flange parts 16 can thus be inserted simultaneously into the cut-out 26 via their integrally formed foot regions 19 and thus be mounted on the base frame 10 or on the side wall 12 of the base frame 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Holding frame
10 Base frame
11 First side wall
12 Second side wall
13 First end wall
14 Second end wall
15 Interior
16 Flange part
17 Outer surface
18 Inner surface
19 Foot region
20 Head region
21 Central section
22 Outer edge
23 Outer edge

24 Connection region
25 Shoulder surface
26 Shoulder surface
27 Cut-out
28 Fastening element
29 Opening
30 Fastening region
31 Fastening tab
32 Fastening tab
33 Lower edge
34 Upper edge
35 Receiving section
36 Outer side
37 Lower edge
38 Bearing face
39 Opening
40 Upper edge
41 Inner edge
42 Inner edge
43 Identification element
200 Module
210 Projection element
E Insertion direction
M Mounting direction
$B_F$ Foot region width
$B_M$ Central section width
$B_K$ Head region width

The invention claimed is:

1. A holding frame for a plug connector for installation into a metal connector housing and for the protective earthing thereof, and for accommodating similar and/or different modules, comprising:
a base frame; and
at least one flange part,
wherein the holding frame comprises at least two different materials, of which at least one material is electrically conductive,
wherein the base frame comprises a die-cast component,
wherein the at least one flange part comprises resilient sheet metal, and
wherein the at least one flange part has trapezoidal tapering.

2. The holding frame of claim 1, wherein the at least one flange part has a fastening region configured to hold the modules, and
wherein the at least one flange part tapers trapezoidally in a direction of the fastening region.

3. The holding frame of claim 2, wherein the fastening region is formed on a head region of the at least one flange part, which is positioned on an end section of the flange part lying opposite a foot region.

4. The holding frame of claim 3, wherein the at least one flange part is fastened to the base frame via the foot region.

5. The holding frame of claim 3, wherein that the at least one flange part in the foot region has a fastening element which, in the mounted position, is in engagement with an opening formed in the base frame.

6. The holding frame of claim 3, wherein, in a mounted position, the base frame has at least one slot-shaped cut-out into which the foot region of the at least one flange part is inserted.

7. The holding frame of claim 2, wherein the fastening region has at least one fastening tab configured to hold the modules.

8. The holding frame of claim 7, wherein the fastening region has two fastening tabs.

9. The holding frame of claim 7, wherein the at least one fastening tab has a length which is at least three times a thickness of the at least one flange part.

10. The holding frame of claim 3, wherein the at least one flange part has, between the foot region and the head region, a central section, and
wherein the central section tapers trapezoidally from the foot region towards the head region.

11. The holding frame of claim 10, wherein, in a connection region of the foot region, an offset is formed on the central section such that the foot region extends in a first plane and the central section extends in a second plane arranged offset to the first plane.

12. A plug connector, comprising:
a housing;
the holding frame of claim 1 arranged in the housing; and
at least one module received in the holding frame.

13. An electronic device, comprising:
at least one plug connector of claim 8.

14. A holding frame for a plug connector for installation into a metal connector housing and for the protective earthing thereof, and for accommodating similar and/or different modules, comprising:
a base frame; and
at least one flange part,
wherein the holding frame comprises at least two different materials, of which at least one material is electrically conductive,
wherein the base frame comprises a die-cast component,
wherein the at least one flange part comprises resilient sheet metal,
wherein the at least one flange part has trapezoidal tapering,
wherein the at least one flange part has a fastening region configured to hold the modules,
wherein the at least one flange part tapers trapezoidally in a direction of the fastening region,
wherein the fastening region has at least one fastening tab configured to hold the modules,
wherein the fastening region has two fastening tabs, and
wherein the two fastening tabs of a fastening region are arranged on opposite outer edges of the at least one flange part.

15. The holding frame of claim 14, wherein the fastening tabs are each formed bent at an angle $\alpha \geq 90°$ to the outer edge of the at least one flange part.

16. A holding frame for a plug connector for installation into a metal connector housing and for the protective earthing thereof, and for accommodating similar and/or different modules, comprising:
a base frame; and
at least one flange part,
wherein the holding frame comprises at least two different materials, of which at least one material is electrically conductive,
wherein the base frame comprises a die-cast component,
wherein the at least one flange part comprises resilient sheet metal,
wherein the at least one flange part has trapezoidal tapering,
wherein the at least one flange part has a fastening region configured to hold the modules,
wherein the at least one flange part tapers trapezoidally in a direction of the fastening region,
wherein the at least one flange part in a mounted position is arranged on a receiving section formed on a side wall of the base frame, wherein the receiving section has an opening configured to receive a projection element of a module inserted into an interior of the base frame, and wherein, in the mounted position of the at least one flange part, on the base frame the opening is overlapped at least in regions by the fastening region of the at least one flange part.

17. The holding frame of claim 16, wherein the receiving section is formed on an outer side, facing away from the interior, of the base frame.

* * * * *